UNITED STATES PATENT OFFICE.

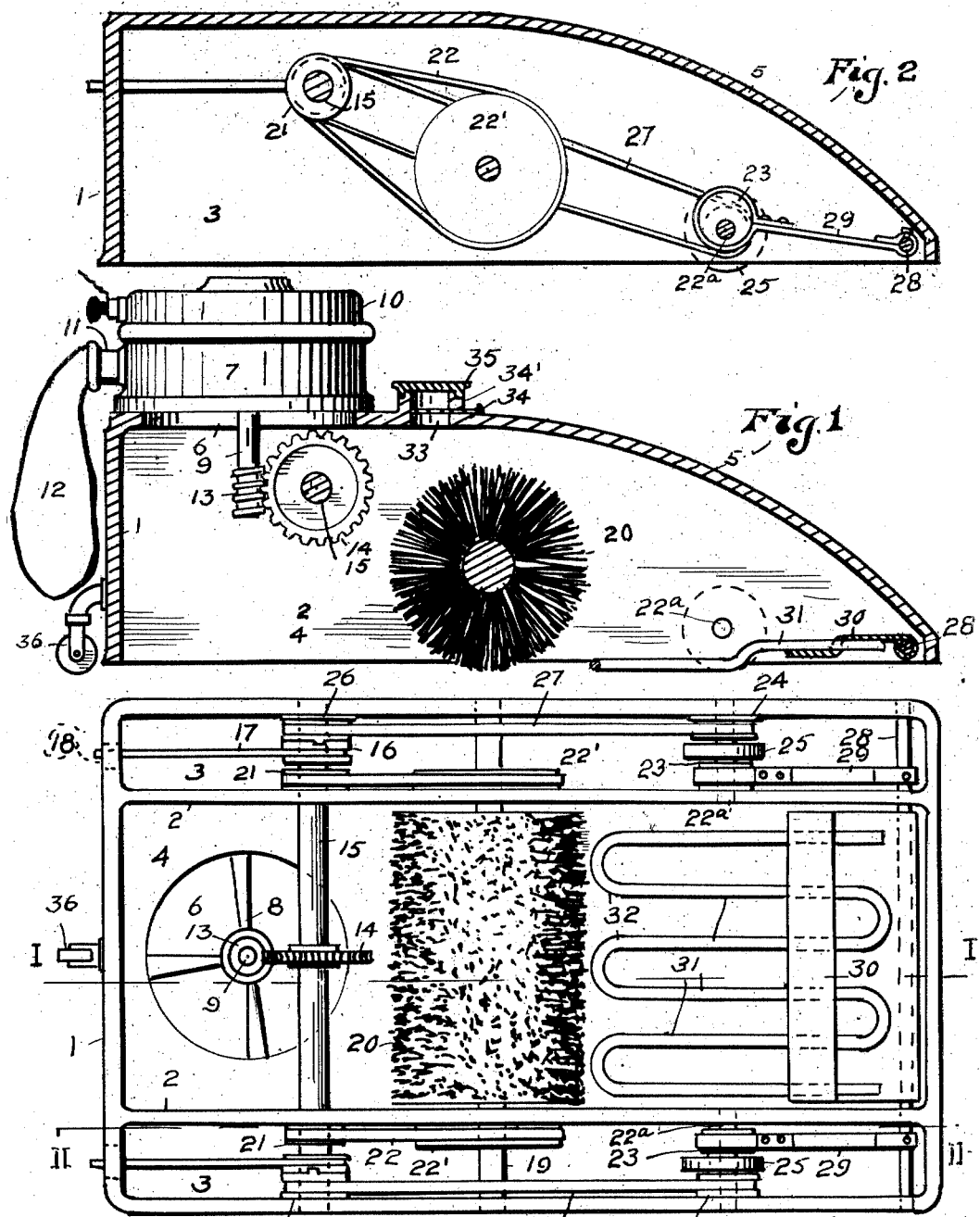

WILMER H. YERKES, OF PITTSBURGH, PENNSYLVANIA.

VACUUM-SWEEPER.

1,366,998. Specification of Letters Patent. Patented Feb. 1, 1921.

Application filed June 25, 1920. Serial No. 391,661.

*To all whom it may concern:*

Be it known that I, WILMER H. YERKES, a citizen of the United States, residing at Pittsburgh, in the county of Allegheny and State of Pennsylvania, have invented certain new and useful Improvements in Vacuum-Sweepers, of which the following is a specification.

This invention relates to vacuum cleaners, and the object thereof is to provide, in a manner as hereinafter set forth, a machine of such class, which is thoroughly efficient in its use, portable, and combining therein simultaneously operable vacuum or suction, brushing and beater elements for expeditiously cleaning floors, carpets, and the like, by the removal of dirt or other foreign substances therefrom.

Further objects of the invention are to provide a vacuum cleaner which is simple in its construction and arrangement, strong, durable, convenient in use, readily set up, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1, is a longitudinal section view of the machine on line I—I Fig. 3.

Fig. 2, is a like view on line II—II Fig. 3.

Fig. 3, is an inverted plan, that is looking up through the bottom of the machine.

Referring to the drawings in detail the machine comprises a body portion, a rectangular frame 1 having arranged therein, near each side, a longitudinally extending partition member 2, and these members 2 form a pair of outer compartments 3 and a central compartment 4. The body portion includes a cover plate 5 which is mounted on the frame 1 and secured thereto in any suitable manner. The cover 5 near the rear thereof is provided with an enlarged opening 6.

Mounted on the cover 5 is a casing 7, which provides a fan chamber, in which is arranged a fan 8, carried by the shaft 9, of a motor 10, the latter is mounted on the casing 7. The casing 7 has an outlet nipple 11, to which is attached a flexible collecting receptacle 12, for receiving the matter collected during the cleaning operation.

The motor shaft 9 depends below the fan 8 and into the chamber 4, and has its lower end provided with a worm 13, which meshes with a worm wheel 14, carried by a driven shaft 15, extending transversely of and journaled in the sides of the frame 1. The shaft 15 extends through the partition members 2, and has mounted thereon, within each of the chambers 3, a clutch mechanism 16, the latter includes a clutch operating lever 17, which projects rearwardly and through a slot 18, in the rear wall of the frame 1.

Journaled in the side walls of the frame 1 and extending through the members 2, forwardly of the shaft 15, is a shaft 19 for revolving a cylindrical brush 20, the latter is fixed to the shaft 19 and arranged within the chamber 4. The shaft 15 within each of the chambers 2 is provided with a pulley 21, these latter are fixed on the shaft and connected by a transmission belt 22 with pulleys 22' on the shaft 19, under such conditions the shaft 19 is driven and the brush 20 revolved.

Journaled in each side of the frame 1 and in the opposed partition member 2 of the respective side is a short shaft $22^a$, and each of said shafts $22^a$ has fixed thereon an eccentric 23 and a pulley 24, as well as a supporting wheel 25, the latter however is loosely mounted on the shaft. The shaft 15 within each of the chambers or compartments 2 has an additional pulley 26, adapted to be coupled to the shaft 15 by the clutch 16. The pulleys 26 are connected with the pulleys 24 by transmission belts 27, whereby when the pulleys 26 are clutched to the shaft 15, the shafts $22^a$ are operated and the eccentrics 23 carried therewith.

Journaled in the sides of the frame 1 and extending through the members 2 is a rock shaft 28, to which is attached near each end an eccentric strap 29, operated from the eccentric 23, for oscillating or rocking the shaft 28. Secured to the shaft 28 and projecting rearwardly therefrom is a supporting plate 30 for a beater element. The plate 30 comprises a high part and a low part connected together by a slotted offset portion. The plate 30 is arranged in the chamber or compartment 4, is oscillated by the shaft 28 and imparts a like movement to the beater element.

The beater element is formed of a series of opposed beater-arms, arranged in spaced relation and connected together at their front and rear by curved bends. The beater arms are indicated at 31, are formed from a single length of twisted wire of the desired diameter or of any other suitable material and the bends therein for connecting the arms are indicated at 32. The rear portion of the arms 31 are offset relative to the forward portion so that the said rear portion will be below the plane of the forward portion. The beater arms have their forward ends secured to the lower face of the high portion of the plate 30, and said forward portions of the beater arms extend through the offset portion of the plate 30 and extend over the upper face of the low part of the plate 30. The beater elements extend in close proximity to the brush 20.

The cover 5 has an opening 33, forwardly of the opening 6, and which is normally closed by a slide 34. A nipple 34' projects from the cover 5, at the opening 33, so that a hose can be attached thereto whereby the machine can be utilized for cleaning at a distance therefrom. A cap 35 is mounted on the nipple, and which is removed when the hose is to be attached.

At the rear of the frame 1, a supporting wheel 36 is arranged which associates with the wheels 25 for supporting the machine as it is moved from point to point.

What I claim is:—

A vacuum cleaner comprising a revoluble brush element, a rock shaft, a pair of eccentrics connected with the shaft for oscillating it, a plate fixed to and projecting rearwardly from the shaft and having a high and a low part connected together by a slotted offset portion, and a beater element fixed to the lower face of said high part and further extending through said offset portion and upon the upper face of the low part of the plate and extending rearwardly toward said brush element.

In testimony whereof I affix my signature.

WILMER H. YERKES.